W. J. SCHAEFER.
PROCESS FOR PEELING FRUIT.
APPLICATION FILED FEB. 8, 1915.
1,205,110.
Patented Nov. 14, 1916.
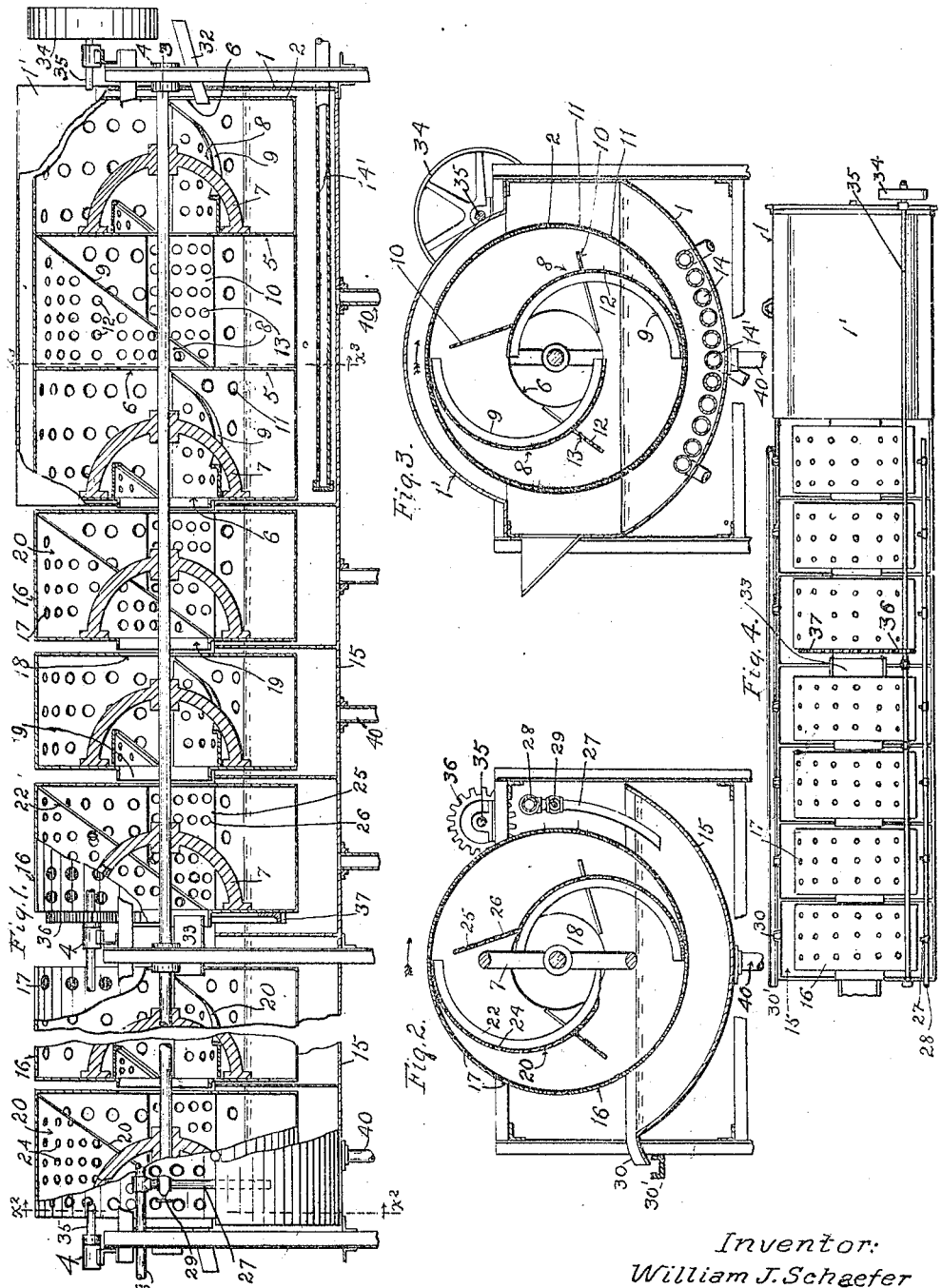
Witnesses:
A. W. Knight
S. W. Knight
Inventor:
William J. Schaefer
by Arthur P. Knight
his Atty

UNITED STATES PATENT OFFICE.

WILLIAM J. SCHAEFER, OF ONTARIO, CALIFORNIA.

PROCESS FOR PEELING FRUIT.

1,205,110.  Specification of Letters Patent.  Patented Nov. 14, 1916.

Application filed February 8, 1915. Serial No. 6,889.

*To all whom it may concern:*

Be it known that I, WILLIAM J. SCHAEFER, a citizen of the United States, residing at Ontario, in the county of San Bernardino and State of California, have invented new and useful Processes for Peeling Fruit, of which the following is a specification.

This invention relates to a process for removing the peel or skin from peaches or other fruit, preparatory to canning the same, or otherwise preparing it for food purposes, and the main object of the invention is to provide for performing this peeling operation rapidly and economically and without injury to the fruit.

My process consists essentially in first treating the fruit, as by scalding, so as to loosen the skin thereof, and then causing the fruit to move rapidly in contact with a body of washing liquid, such as water, so as to cause the skin to be removed from the fruit by the frictional action due to such motion. My process is carried out by repeatedly dropping the fruit into water by a sufficient number of consecutive operations to remove the skin from the fruit, the fruit being repeatedly lifted out of the water and allowed to fall into the water by gravity, so that the impact of the water on the fruit, together with the rapid motion of the fruit through the water, as it falls into and is drawn through the same, act to detach or dislodge the loosened skin, which is then washed away from the fruit by the action of the water, the process being preferably so carried out that the fruit is brought in contact with fresh water at each washing operation.

The accompanying drawings illustrate an apparatus suitable for carrying out my invention, and referring thereto:

Figure 1 is a longitudinal section of the apparatus, partly in elevation, and part of the washing apparatus being omitted. Fig. 2 is a section on line $x^2$—$x^2$ in Fig. 1. Fig. 3 is a section on line $x^3$—$x^3$ in Fig. 1. Fig. 4 is a plan view of the complete apparatus.

The apparatus comprises a scalding apparatus and a washing apparatus adapted to operate successively on the fruit. The scalding apparatus comprises a tank 1, adapted to contain a weak solution of soda, or other liquid adapted to loosen the skin of the fruit to be peeled, and a drum 2 rotatably mounted in said tank, by a shaft 3 carrying said drum and mounted in bearings 4. Said drum is divided into any desired number of compartments by partitions 5, the ends of the drum and said partitions having openings 6, through which the fruit may be passed in the operation of the apparatus. The drum may be mounted on shaft 3 by spiders 7 on said shaft secured to partition and end walls of the drum, so as to leave the openings 6 clear for passage of fruit. Each compartment of the drum is provided with fruit elevating means for lifting the fruit in such compartment and delivering it through the opening at the delivery end of the compartment. For this purpose scoops 8 are mounted in the respective compartments, said scoops being for example formed as curved plates, bent as segments of cylinders, each curved plate extending tangentially inward from the cylindrical wall of the drum and curving around the shaft 3 to the opposite side of the shaft, in such manner that the plate presents a concavity on the face which is at the front thereof with respect to the direction of motion. Said scoop is also formed with means for pushing or feeding the fruit forward toward the delivery opening of the compartment, said means consisting of a flange or wall 9 at the rear edge of the said curved plate, said rear edge extending at an inclination to the axis of the drum, so that its forward end is adjacent to the receiving end of the drum and its rear end is adjacent to the delivery end of the drum. Agitating plates or blades 10 are also mounted in the compartment to move the fruit through the solution or water. The drum 2 is perforate as shown at 11, to enable the solution in the tank to move freely into and out of the drum, and the scoops 8 and plates 10 are also perforated as shown at 12 and 13, to minimize the resistance to motion through the liquid, and permit the liquid to drain from the fruit as it is lifted in the scoops. Means such as a steam coil 14 is provided for heating the contents of tank 1, and in order to conserve the heat, said tank may be provided with a cover or casing 1'. Tank 1 may also have a perforate steam pipe 14'.

The washing apparatus comprises a series of tanks 15, adapted to contain water, and washing drums 16 in the respective tanks, mounted on the shaft 3 aforesaid, so that the lower part of each drum is immersed in the body of water in its tank, said drums being provided with perforations 17 for access of the water to the interior thereof, and with end openings 18 and 19 for passage of fruit into and out of the drums. Each drum is further provided with fruit lifting means consisting of scoops 20 formed as curved plates extending partly around the shaft 3, said scoops curving tangentially inward from the cylindrical wall of the drum and being concave on the face which is at the front thereof in the forward motion of the scoop, to enable them to scoop up the fruit. A wall or flange 22 is provided at the rear edge of the scoop and said rear edge is inclined to the axis of the drum, that end of the flange 22 which is farthest in advance in the rotation of the drum being at the receiving end of the drum, and the other end of the flange being at the delivery end of the drum, adjacent to the delivery opening 19 of the drum, so that said flange operates as a pushing means for advancing the fruit toward the delivery opening, in the revolution of the scoop. The scoops 20 are so arranged that each scoop delivers the fruit into the next drum between the scoops therein, so that the fruit will fall into the water without starting the scoops. Said scoops are preferably perforated, as shown at 24, to minimize the resistance offered in passing through the water, and allow the water to run out as the fruit is lifted above the surface of the water in the tank, so that the power required for operation is reduced to minimum. In order to equalize or distribute the load on the driving means due to lifting the fruit, the lifting scoops are variantly placed in different drums 16 and in different compartments of the drum 2. Agitating plates 25 are mounted in the drums 16, to force the fruit down into and through the water in the tanks 15, said plates being perforated as at 26 to reduce the resistance to motion thereof through the water. Means are provided for independent supply of water to the several tanks 15, consisting, for example, of pipes 27 branching from a supply pipe 28 and provided with valves 29, and overflow pipes 30 are provided for said tanks, discharging to a launder 30', so that the supply of water in the tanks is continually being renewed or replenished. Drain pipes 40 are provided for draining off the contents of the tanks when necessary. Fruit is fed to the scalding apparatus through a chute 32, and the several tanks are so positioned that the fruit passing out through the delivery opening of any drum falls into the receiving opening of the next drum. Suitable guides 33 being provided, where necessary, to guide the fruit between such openings. Shaft 3 may be operated from a driving pulley 34, through the shaft 35 of such pulley carrying a gear wheel 36, engaging a gear wheel 37 on shaft 3.

My process is carried out in the above described apparatus as follows: A weak lye or alkali solution is placed in tank 1, and is heated to a suitable temperature, for example to about 100 degrees C. by means of steam coil 14. The fruit is supplied to the first compartment of the drum 2 in tank 1 through chute 32, and the shaft 3 being set in motion causes rotation of drum 2, with the result that the fruit is stirred or moved in contact with the solution in said drum, by operation of plates 10, and as the scoops 8 revolve, they pass under the fruit which is on or in the body of liquid in the drum and lift the fruit out of such body of liquid, the flange 9 serving to guide the fruit, so that as the fruit rolls on the scoop, in the revolution of the latter, said flange directs or pushes the fruit toward the delivery opening 6 of the first compartment, and the fruit is thereby caused to fall through said opening into the second compartment. In this compartment the operation above described is repeated, and the fruit is passed on in this manner until it is discharged through the delivery opening 6 of the last compartment, and through the receiving opening 18 of the first washing drum.

The action of the heated solution in the scalding drum serves to loosen the skin of the fruit, so that it is prepared for the operation of the washing drums. When the fruit falls into the first washing drum, the rotation of such drum operates by the action of plates 25, to cause the fruit to be moved into and through the body of water therein, and the revolution of scoops 20 carries the fruit out of the body of water and, with the aid of the oblique flange 22, delivers it through the opening 19, to the body of water in the second tank. As shown in Fig. 1, the scoop means 20 in the respective tanks are so arranged that when any scoop means is discharging and dropping fruit from the drum of any tank into the next succeeding tank, the portion of the said succeeding tank adjacent to and below the inlet thereof is unobstructed by any scoop or other means, so as to permit free dropping of fruit into the liquid, without injury thereto. This operation is repeated in each of the series of tanks, so that the fruit is repeatedly lifted out of a body of water and dropped into a body of water. The impact of the fruit on the water, and the rapid motion of the fruit through the water causes the skin to be detached from the fruit, and to be washed therefrom by the action of the current of water due to flow of water from the inlet to the outlet of each tank, and as each washing tank 15 has a separate supply and outlet for water, the skin detached in each tank is washed away from the fruit before it enters the next tank, so that there is no accumulation of skins in the water, and each washing operation begins in comparatively clean water, so that the water may come in effective frictional contact with the undetached skin, without interference by adhering skin previously detached. The fruit is finally delivered through the opening 19 of the last washing tank to suitable receiving means.

I have found that by repeatedly dropping the fruit into water as above described, the skin or peeling may be detached therefrom with a minimum of injury to the body or pulp of the fruit; and that in the case of peaches, for example, a proper amount of scalding, followed by, say, six to ten of these dropping actions, is sufficient to completely peel the fruit with no injury thereto. On account, moreover, of the comparatively gentle and distributed action of the impact and motion through the water, as compared with the concentrated action of water jets, I am enabled to peel without injury, fruit which is well ripened, and which would be injured by water jet peeling, by the tendency of the jets to slough off the soft parts of the pulp.

What I claim is:

1. The process of peeling fruit which consists in first treating the fruit to loosen the skin, and then causing the fruit to drop repeatedly into separate bodies of liquid and to move rapidly through the liquid, said dropping operation and the movement of the fruit through the liquid being consecutively repeated a sufficient number of times to completely detach the skin from the fruit.

2. The process of peeling fruit which consists in first treating the fruit to loosen the skin, then causing the fruit to drop consecutively into and pass through separate bodies of liquid to detach the skin from the fruit and renewing the liquid in each body.

3. The process of peeling fruit which consists in first treating the fruit to loosen the skin, and then causing the fruit to drop consecutively into currents of liquid to detach the skin from the fruit and cause the detached skin to be washed away by such currents of liquid.

4. The process of peeling fruit which consists in first treating the fruit to loosen the skin, and then causing the fruit to drop into and move rapidly through moving liquid which is continually renewed, said dropping operation and the movement of the fruit through the liquid being consecutively repeated a sufficient number of times to completely detach the skin from the fruit and to wash-away the detached skin by the movement of the liquid.

In testimony whereof I have hereunto set my hand, at Los Angeles, California, this 25th day of January 1915.

WILLIAM J. SCHAEFER.

Witnesses:
A. P. KNIGHT,
OSCAR E. WINBURN.